March 6, 1956 — H. G. TASKER ET AL — 2,737,654
EXPANDED PRESENTATION PRODUCED WITH LOGARITHMIC SWEEPS
Filed July 21, 1950 — 2 Sheets-Sheet 1
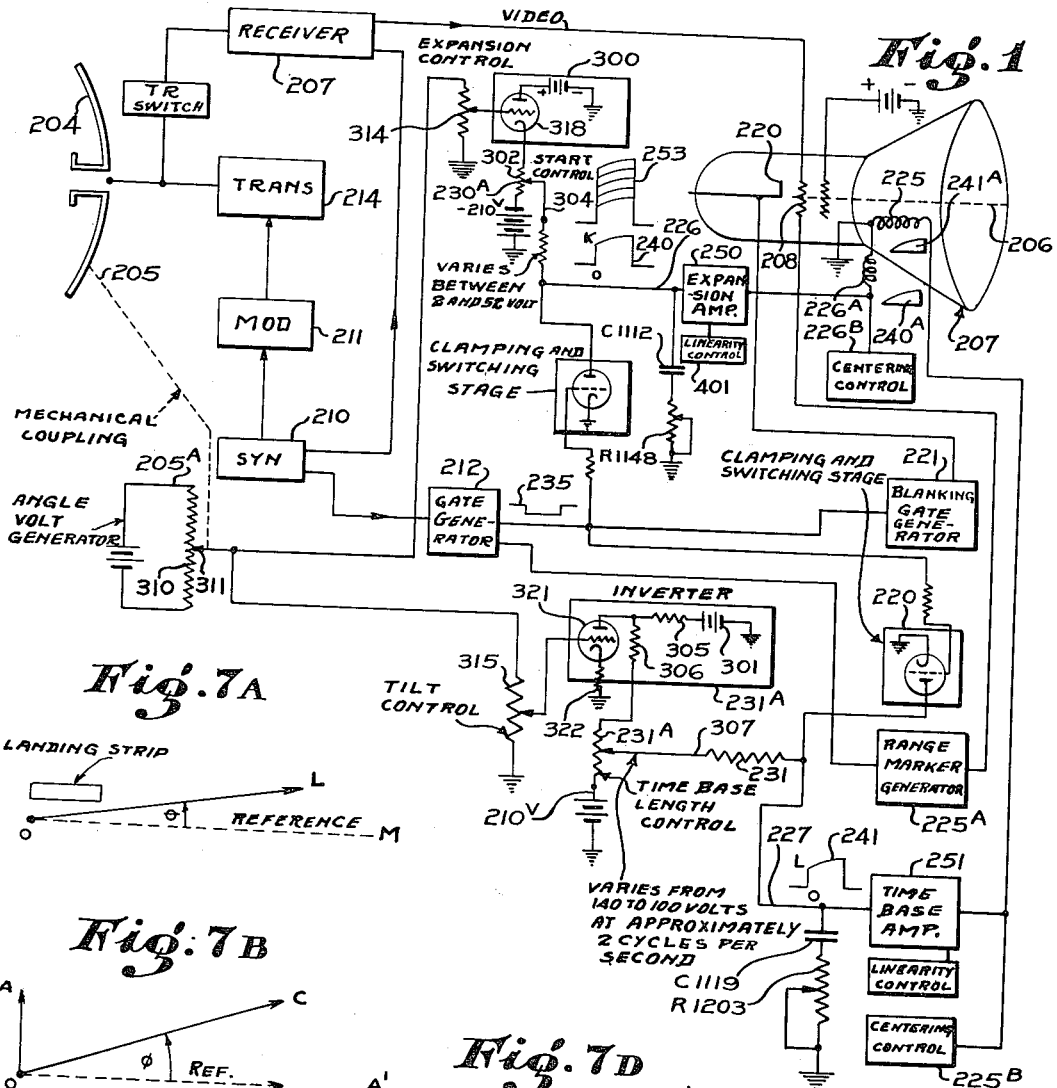
Fig. 1
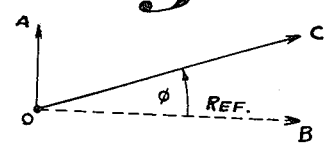
Fig. 7A
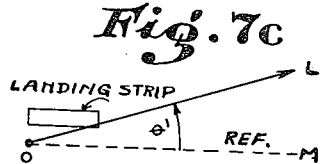
Fig. 7B
Fig. 7C
Fig. 7D
INVENTORS
HOMER G. TASKER
MARTIN H. SHULER
BY Lyon & Lyon
ATTORNEYS.

March 6, 1956  H. G. TASKER ET AL  2,737,654
EXPANDED PRESENTATION PRODUCED WITH LOGARITHMIC SWEEPS
Filed July 21, 1950  2 Sheets-Sheet 2
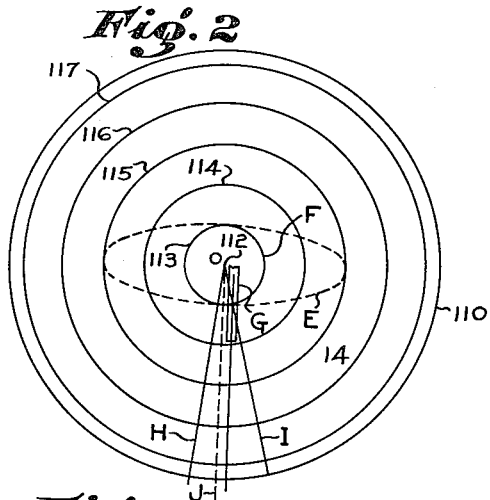
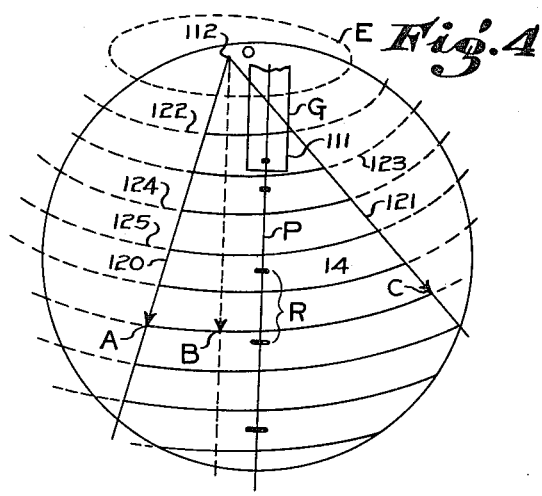
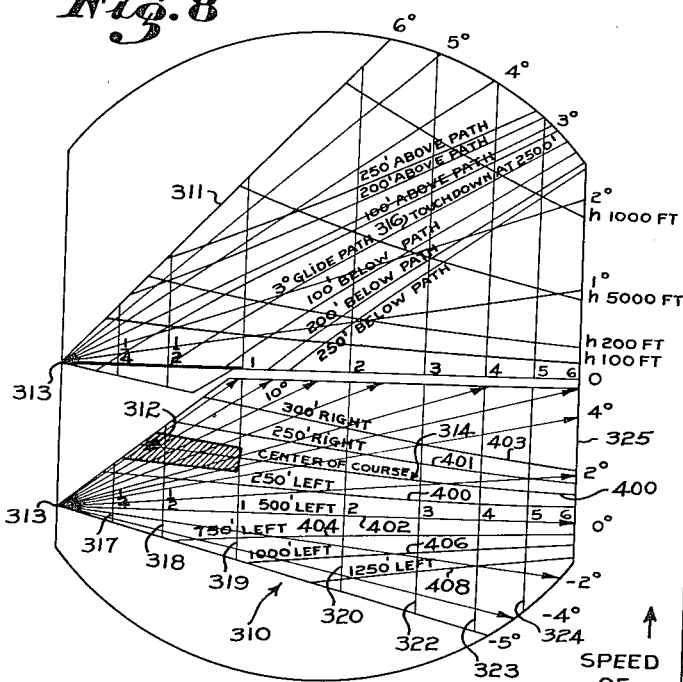
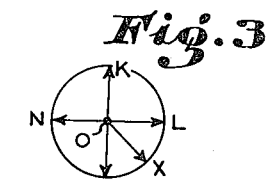
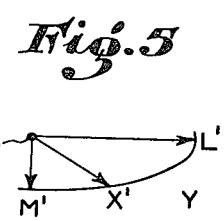
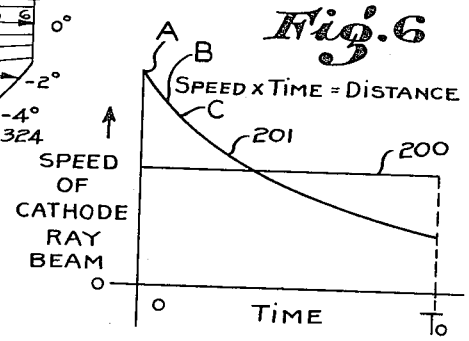
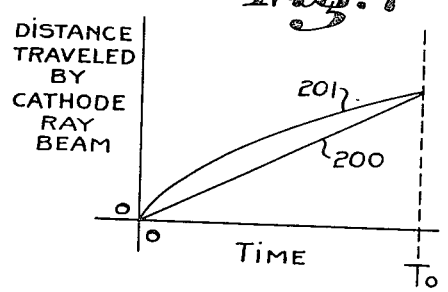
INVENTORS
HOMER G. TASKER
MARTIN H. SHULER
BY Lyon & Lyon ATTORNEYS.

United States Patent Office 2,737,654
Patented Mar. 6, 1956

2,737,654

EXPANDED PRESENTATION PRODUCED WITH LOGARITHMIC SWEEPS

Homer G. Tasker, Van Nuys, and Martin H. Shuler, Los Angeles, Calif., assignors to Gilfillan Bros., Inc., Los Angeles, Calif., a corporation of California Application July 21, 1950, Serial No. 175,168

15 Claims. (Cl. 343—11)

The present invention relates to a method and apparatus for indicating or determining the position of a body in space; and, in particular, to an improved form of the cathode ray tube indicating system described and claimed in the copending patent application of Homer G. Tasker, one of the joint applicants herein, Serial No. 680,604, filed July 1, 1946, for Expanded Plan Position Indicator, and assigned to the same assignee as the present application.

In this mentioned copending patent application a technique is described whereby polar sweeps of a cathode ray beam, each of the same duration, are effectively changed in length in an amount depending upon the particular angular position of the sweep and corresponding angular position of a radar beam in space, to thereby produce on the cathode ray tube face a unidirectional magnified representation of such space whereby the position of an aircraft with respect to the center line of a landing strip may be accurately determined in a so-called G. C. A. system.

In the prior art arrangements, as shown in the above mentioned copending patent application, although the lengths of the individual sweeps were varied in accordance with the particular angular position of the sweep, radar range distances or time intervals (corresponding to the time of transit of a radar pulse to and from a target) were measured on a uniform scale along the length of the sweep, i. e., the same incremental distance along the same sweep corresponded to the same radar range distance.

A feature of the present arrangement is that corresponding radar range distances, instead of being measured on a uniform scale, are measured on a logarithmic scale, there being provided for this purpose, new techniques whereby the cathode ray beam moves at a non-uniform decreasing rate in producing a sweep, while simultaneously the effective length of the sweep is changed in an amount depending upon the particular angular position of the sweep.

It is therefore an object of the present invention to provide an improved indicating arrangement in a G. C. A. (ground controlled approach) system wherein distances are measured or determined on a logarithmic scale so that the position of an aircraft may be determined with an accuracy which increases as the aircraft approaches a predetermined touchdown point on an aircraft landing field.

Another object of the present invention is to provide circuitry for obtaining the above mentioned results in a simple and expeditious manner.

Another object of the present invention is to provide improved techniques and apparatus whereby a G. C. A. system may be converted to produce either logarithmic or linear sweeps, as desired, using either a pair of cathode ray tubes to obtain the position of an aircraft in space or using one cathode ray tube, the so-called Az-El indicating system, as described and claimed in the copending patent application of Homer G. Tasker et al., Serial No. 776,702, filed September 29, 1947, now U. S. Patent 2,649,581, issued August 18, 1952, for Single Scope Two Coordinate Radar Systems, and assigned to the same assignee as the present application.

Another object of the present invention is to provide an improved G. C. A. system in which the representation or determination of an aircraft in three dimensions may be obtained with increased accuracy by changing the instantaneous magnitude of a quantity at a non-uniform decreasing rate, while simultaneously varying the ultimate magnitude of the quantity in a degree depending upon the angular position of a transmitted radar pulse.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1 is a schematic representation of apparatus embodying the present invention.

Figures 2, 3, 4, 5, 6, 7, 7A, 7B, 7C and 7D are graphic representations helpful in explaining certain features of the present invention.

Figure 8 shows the presentation obtained on the face of the cathode ray tube using the apparatus shown in Figure 1, and also includes a representation of the landing strip as well as reference lines.

Figure 2 shows a representation obtained by the use of a conventional PPI such as is used in the so-called "search" portion of GCA equipment to which the present invention has specific application. In Figure 2, the series of concentric circles is the loci for points of constant distance from the center, and each of such circles is known as a range mark. The outer circular line is not a so-called range mark but is a representation of the outer circumference of the cathode ray tube. The elongated elliptically shaped range mark E corresponds to range mark F when the PPI is modified in accordance with the present invention.

Figure 3 illustrates the four sweep vectors ON, OK, OL and OM in a conventional PPI which vary in magnitude between zero and a mutually equal magnitude in timed relationship to produce the resultant vector which at any particular instant is represented by the generalized vector OX as is described more fully below. These four equal vectors ON, OK, OL and OM in space quadrature and of equal maximum intensities may be produced respectively by individual ones of four equally circumferentially spaced cathode ray deflecting means acting alone, the arrows on such vectors indicating both the fixed direction of the vector and the direction in which the cathode ray beam tends to be moved. These four vectors in a PPI system are in space quadrature and are varied in magnitude with respect to time to produce the rotating vector OX of constant length thereby to define circles corresponding to the circular range marks shown in Figure 3. It is understood, of course, that such range marks are produced by intensifying the cathode ray beam at predetermined equal time intervals when such beam is being moved outwardly in production of a sweep. This form of picture made by the rotating vector OX in a PPI may be likened to a map expressed in polar coordinates where a point on such map may be represented by the conventional polar coordinates $\rho$ (rho) and $\theta$ (theta) wherein $\theta$ is the azimuth angle at which a radar antenna beam is being directed and where $\rho$ is directly proportional to the range or distance to such point.

In the conventional PPI pattern shown in Figure 2, the aircraft landing strip G and the two radial lines H and I are, for purposes of analysis and orientation, superposed to indicate the sector defined by HOI, which is to be expanded in accordance with one phase of the present invention in a direction perpendicular to line OJ to thereby achieve some of the important results of the present invention.

Figure 4 shows a representation obtained on a cathode ray tube incorporating one phase of the present invention when the sector HOI mentioned above is expanded; that is, Figure 4 is related to Figure 2 in the sense that the sector HOI obtained by use of conventional PPI is expanded and displaced on the cathode ray tube as indicated by the sector AOC in Figure 4. In Figure 4 the partially full lines and partially dotted curved lines, forming extensions of corresponding full lines, represent the loci of points of constant range from the point or origin O which corresponds to the point where the radar equipment is located. It is noted also that the electrical adjusted center of the cathode ray tube is adjusted to a point near the outer boundary of the tube to thereby make more efficient use of the tube.

Figure 5 is related to Figure 3 in that the two vectors OL' and OM', each acting constantly in the direction indicated, but with intensities varying from zero to their maximum values indicated in Figure 5, are utilized to obtain at one particular instant the resultant vector OX', the angular position and length (intensity) of which vector OX' varies with time. These two vectors OM' and OL' in quadrature may be produced respectively by individual ones of two cathode ray deflecting means acting alone and in space quadrature, such as by current flowing in the two magnetic deflection coils of the cathode ray tube shown in Figure 1. The arrows on such vectors OL' and OM' indicate both the constant direction of the vector and the direction in which the cathode ray beam tends to be moved to thereby produce the sweep vector OX'. These two vectors in space quadrature are varied in magnitude with respect to time to produce the rotating vector OX' of variable length thereby to define elongated figures such as the elongated or elliptical range mark shown in Figure 5.

Since, in the particular system described, there are two antenna scanning beams, i. e., one for azimuth information and one for elevation information, and since these scan respectively through angles of approximately 20° and 7°, it becomes highly desirable, in accordance with one phase of the present invention, to pivot or move generally laterally to a relatively large degree the sweeps of the synchronized cathode ray beam in order to permit more accurate observation. Azimuth positions of the approaching aircraft are obtained by causing the respective cathode ray sweeps to scan the cathode ray tube in synchronism with the azimuth radar antenna beam scan. The elevation indicating system is basically the same as the azimuth indicating system, but for the elevation antenna scanning in a vertical plane instead of a horizontal plane, and for that reason only the azimuth indicating system is described in detail below.

One of the important features of the present invention is the particular manner in which the sweeps of the synchronized cathode ray sweeps are expanded. Although the azimuth indicator sweep which would normally scan through 20° is expanded three times, thus making the included angle of the representation on the cathode ray tube in Figure 4 in the order of 60°, the particular type of expansion in each case is not direct angular expansion but is of the type described in connection with Figure 5. The expansion of the sweeps is of such nature that a presentation results having what we term "unidirectional expansion" or "unidirectional magnification."

Such "unidirectional expansion" or "unidirectional magnification" may be likened or compared to drawing a number of lines on a sheet of rubber, some horizontal, some vertical, and some at an angle, and then stretching the rubber sheet in a horizontal direction, meanwhile holding the vertical dimension constant. In such case, vertical lines have their lengths unchanged and are still parallel and straight, but their horizontal spacing is increased in proportion to the amount of stretch. Also, the horizontal lines increase in length, but remain parallel and straight, and the slopes of the angular lines are reduced but they remain straight.

The expansion, i. e. radial or generally lateral movement of the sweeps to produce such unidirectional expansion or unidirectional magnification is of a hyperbolic type, that is, the expansion, i. e. pivoting or generally lateral movement of the sweep, is occasioned not only by moving the sweep (vector) angularly, but also simultaneously changing its magnitude. Each sweep may be considered as a vector having a fixed center or origin from which all vectors radiate. When a vector of constant length is rotated, i. e. changed in a direction perpendicular to its length, it is said to vary in accordance with a trigonometric function such as a sine or cosine function; but when the vector is changed in the direction of its length and also rotated, it is said to move in accordance with a hyperbolic function. A sweep in a conventional PPI is rotated without changing its length and without changing in accordance with a hyperbolic function. But, in accordance with certain aspects of the present invention, the sweep is changed appreciably in the direction of its length in a predetermined manner in accordance with a hyperbolic function to produce new results.

Briefly, in accordance with certain aspects of the present invention, radar equipment is used to scan space through an angle $\theta$, and synchronously therewith a cathode ray sweep is varied in accordance with a trigonometric function of $n\theta$ where $n$ stands for a number greater than one, and simultaneously the length of such sweep is periodically varied in accordance with a hyperbolic function of $n\theta$, the particular relationship between the trigonometric function and hypebolic function being ascertained in accordance with the principles set forth in the article entitled "Complex Angles" by Aram Boyagian, on pages 155–164 of Journal 42 of the American Institute of Electrical Engineers, February 1923.

This difference is shown in comparing Figures 2 and 4, where in Figure 2 the cathode ray sweeps rotate about the center without changing their length to define the solid line concentric circles which are the loci of points of constant distance, as in a conventional PPI system. But in Figure 4 the cathode ray sweeps are not only changed angularly but in length as well to define a solid series of curved lines which form part of an elongated figure resembling ellipses shown partly in Figure 4 and as a complete dotted elongated figure in Figure 2. Such dotted elongated figure in Figure 2 and curved full lines in Figure 4, are the loci of points of constant distance from the center in a system producing the desired type of expansion. In such case, it is said that the sweep or vector OA is longer in the position shown than when it is moved to the position OB, the sweep OA being movable both angularly and "stretched" in the direction of its length to produce an area defined by AOC, which area is expanded unidirectionally in a direction perpendicular to the direction indicated by line OB. It is observed that the time of travel of each sweep, although some are longer than others, is the same; and, since time is proportional to distance, so far as transmitted and reflected radar pulses are concerned, lengthening the sweeps, corresponds to lengthening the distance represented on the cathode ray tube face.

While the path ABC traced by the extremity of vector OA is curved to the extent shown, it is within the scope of the present invention to provide more or less curvature to the path or line ABC, and, in fact, to make the line ABC substantially straight. This variation in curvature of the line ABC may be controlled by such means described later, and in particular by adjusting the amplitude of the sweep voltages ultimately applied to the deflection coils of the cathode ray tube.

The manner in which "unidirectional expansion" or

"unidirectional magnification" is obtained may also be explained with reference to Figures 7A and 7B. This concept is described in connection only with the azimuth display, but it is well understood that the same principles hold true in the elevation display.

Figure 7A represents the actual azimuth area scanned by the radar beam. Point O represents the site of the radar antenna. The line OL represents the radar beam when it is at some particular position in space. OM is a line parallel to the center line of the landing strip. For convenience, OM is chosen as a reference from which other measurements are made.

In Figure 7B, the line OC represents the sweep line on the face of the cathode ray tube. The particular position of this sweep OC in Figure 7B represents that particular position in space of the radar beam OL, as shown in Figure 7A.

Likewise, the reference line lying along the broken line OB in Figure 7B represents the reference line OM shown in Figure 1. In particular, it should be noted that there is not a one to one correspondence or relationship between the angle $\theta$ in Figure 1 and the angle $\phi$ in Figure 2. Nor, in fact, is the relationship linear for, as will be demonstrated hereinafter, it is preferred, in a display of this type, that the $\tan \phi = 3 \sin \theta$.

In Figure 7B, the length of the vector OC represents the length of the sweep to, for example, the ten mile range mark.

This line OC may be resolved into two component vectors OA and OB which are mutually perpendicular. The component vector OB is positioned to lie along the aforementioned reference line. The two component vectors OA and OB may be produced respectively by individual ones of two cathode ray deflecting means, acting alone and in space quadrature, such as by current flowing in the magnetic deflecting coils for a cathode ray tube.

In Figure 7C, the radar beam has moved to a new position OL', such that the angle between the radar beam and the reference is now $\theta'$. The position of the corresponding sweep OC' in Figure 7D represents the new position in space of the radar beam OL', as shown in Figure 3. It is again noted that there is not a one to one correspondence or reltaionship between the angle $\theta'$ and the angle $\phi'$.

The effect of "unidirectional expansion" or "unidirectional magnification" may thus be observed upon close consideration of Figures 7B and 7D. In Figure 7B the magnitude of the vector OA' is proportional to the sine of the radar beam angle $\theta$.

Thus:

$$\frac{OA'}{OA} = \frac{\sin \theta'}{\sin \theta}$$

Simultaneously, with the increase in the vector OA, the magnitude of the other component vector OB is held constant. Since the component vector OA is increased and the component vector OB is held constant, the resultant vector OC, which is the sweep, is increased in magnitude. However, the time duration of this sweep is held constant. Time is proportional to distance, so far as transmitted and reflected radar pulses are concerned. Thus, lengthening the sweep but holding constant the time of travel of said sweep, has the effect of spreading out the range distance represented by said sweep. Therefore, the distances represented by the sweeps OC and OC' are the same, namely, ten miles.

"Unidirectional expansion" or "unidirectional magnification" results because the increase in magnitude of the vector OA with antenna angle is to such a degree that distance measured normal to the center line are amplified with respect to the distances parallel to said runway.

In the example given in connection with Figures 7A, 7B, 7C and 7D, the vector OB was held constant. However, in actual use, as described in connection with the circuitry of Figure 1, it is desirable to actually slightly decrease the magnitude of the vector OB with increases in the angle of the radar beam. However, the change in magnitude of the vector OB is considerably less than the change in magnitude of the vector OA for a given change in the angle of the radar beam. The change in the length of OB may be a linear one with respect to the angle of the radar beam.

Preferably, in the display produced by the circuitry of Figure 1, wherein the range marks constitute vertical lines, the $\tan \phi = 3 \sin \theta$ in the azimuth display; and in the corresponding elevation display $\tan \phi = 10 \sin \theta$. Although we prefer a display in which the range marks are made to constitute vertical lines, the range marks may likewise constitute elliptical lines, as represented in Figure 2, and in such case, the relationship between $\phi$ and $\theta$ may be represented by the expression $\tan \phi = n \tan \theta$, where $n$ is greater than one.

In accordance with another feature of the present invention, the rate of travel of the cathode ray beam, forming the sweeps, is such that distances measured therealong are on a substantially logarithmic scale. When the cathode ray beam travels at a substantially uniform rate, as is the case in the arrangement described and claimed in the above mentioned patent application, Serial No. 680,604, the resulting sweeps have the characteristics represented by the lines 200 in Figures 6 and 7, wherein the manner in which the speed of the beam and "distance" traveled by the beam, respectively, as a function of time is represented. In accordance with features of the present invention, the sweeps are produced by a cathode ray beam which has the variations represented by the curved lines 201 in Figures 6 and 7, so that distances measured along the sweep are on a substantially logarithmic scale.

In Figure 6, it is noted that the area under, on the one hand, the entire straight line 200, and on the other hand, the entire curved line 201, both represent the same area, and such area is representative of the distance traveled in time $T_0$ (speed times time equal distance). Thus, in order that the cathode ray beam traverses the same equal distance after an elapsed time $T_0$, the initial speed of the cathode ray beam, which speed is represented by curve 201, must be higher.

While the apparatus described in Figure 1 is shown, for purposes of simplicity, in obtaining a presentation of azimuth and range information, it is evident that the same apparatus may be used in duplicate, as shown in the later figures, to obtain a presentation of elevation and range information on the face of the same cathode ray tube.

In Figure 1 the radar antenna 204, arranged to oscillate in a horizontal plane through, for example, an angle of 20° in order to obtain azimuth range information, is mechanically connected by mechanical connection 205 to impart synchronous movement to an angle voltage generator 205A, which may either be a sine potentiometer (not shown herein) oscillating through an arc of a circle in accordance with the teachings in the above copending patent application, Serial No. 680,604, or which preferably may simply produce a linear variation of voltage as described in the above mentioned copending patent application, Serial No. 776,702; and, when a pulse of radiation from the pulse generator leaves the antenna 204, the beam 206 of the cathode ray tube 207 is caused to leave the adjusted electrical center of the tube traveling in the same corresponding direction as the pulse of radiation to produce a sweep. During this interval in which the sweep is being produced, the intensity of the beam is quite low, being barely visible on the face of the scope. Some time later the transmitted pulse reflected from an aircraft returns as an echo and is received on the radar receiver 207, the output of which is connected to cathode ray grid 208, to thereby intensify the beam and to leave a spot on the tube. The distance of such spot from the adjusted electrical center is dependent on the range or distance of the aircraft from the radar equipment, and upon the position of the aircraft with respect to the antenna. After completion of the sweep, the beam returns to the adjusted electrical center of the tube and waits for the next pulse of radiation to leave.

Sweeps of beam 206 occur in synchronism with the energy pulses transmitted to the antenna; that is, the synchronized timing unit 210 transmits separate triggering pulses to both the modulator 211 and the gate generator 212 in timed relation. The pulse to the modulator 211 results in a transfer of energy from the transmitter 214 to the antenna 204. The pulse to the negative gate generator 212 results in the generation of a so-called "sawtooth" energy pulse, which causes the cathode ray beam 206 to be deflected outwardly from its adjusted electrical center, and to cause a corresponding trace on the cathode ray tube, i. e., a sweep. In order to prevent traces of the cathode ray beam when and as it returns from such outwardly deflected position to its adjusted electrical center, the cathode ray tube is what is termed "blanked out" by using one of many different expedients, for example, by a potential applied to the tube cathode 220 from blanking gate generator 221, which is operated in predetermined time sequence by potential applied thereto from the gate generator 212.

In the system shown in Figure 1 a sweep starts out substantially simultaneously with each pulse of radiation, and the sweep has an angular direction corresponding to the direction of the transmitted antenna pulse. The first requirement is met by the apparatus outlined above, some of which is described in detail later, and the second of these requirements is met by the function of the angle voltage generator 205A which controls the amount of the currents eventually applied to each of the magnetic deflecting coils 225, 226A, having their magnetic axes in quadrature, to produce an angularly variable magnetic field in tube 207 in synchronism with the angular movement of the antenna scanning beam. The electrical center of the beam may be adjusted by adjusting the amount of continuous or direct current flowing in the magnetic deflecting coils 225, 226A, using centering controls 225B, 226B, respectively.

In order to provide suitable range reference marks on the cathode ray tube 207, a range mark generator 225A controls the potential of cathode ray tube grid 208, the range mark generator 225A being synchronized preferably by sharp voltage pulses derived from the gate generator stage 212, and the effect of said generator 225A on grid 208 being blanked out during the return stroke of the cathode ray beam 206 by a control voltage obtained from blanking generator 221.

More specifically, in order to provide an outward sweep of the beam 206, the potential of leads 226, 227, which are normally maintained at a relatively low potential by heavy current conduction through the so-called "clamping and switching" tube stages 228, 229, respectively, are allowed to assume a potential, in accordance with important features of the present invention, determined largely by (1) the instantaneous magnitude of the voltage generated by the angle voltage generator 205A, (2) the magnitude of the gating voltage 235 which ultimately is applied to the leads 226, 227 in inverted amplified form, and, (3) on the one hand, the magnitude of resistances 230, R1148 and condenser C1112; and, on the other hand, by the magnitude of resistances 231, R1203 and condenser C1119.

The voltage derived from the angle volt generator 205A, shown for simplicity as a potentiometer resistance 310 with a variable tap 311 movable in synchronism with scanning motion of the radar antenna, is transferred, on the one hand, to the "Expansion Control" potentiometer 314 and, on the other hand, to "Tilt Control" potentiometer 315. The tap on potentiometer 314 is connected to the control grid of device 318 so that a positive increase in angle volts results in an amplified positive increase in potential of lead 304. In operation, the potential of lead 304 may vary between, for example, 2 and 52 volts at the scan rate of the antenna 204. The tap on the "Tilt" control resistance 315 is connected to the control grid of device 321, which has its cathode grounded through resistance 322. It is noted that device 321 serves as an angle voltage inverter, in that a positive increase in "angle volts" from generator 205A results in a diminution of positive potential on lead 307. This is so since a positive increase of grid potential results in an increased current flow through resistance 305 and thus a decrease in the potential of lead 307. In operation, the potential of lead 307 may vary, for example, within the range of 140 to 100 volts at the scan rate of the antenna.

The leads 226, 227 are normally maintained at a relatively low potential, in the absence of a gating potential 235, since the control grids of stages 228, 229, respectively, are positive and thus cause a relatively high space current to flow respectively from voltage sources 300, 301. Space current flows, on the one hand, from the positive ungrounded terminal of source 300, through device 318, through a portion of the "start" control potentiometer 302, through the lead 304, through voltage dropping resistance 230, and then to ground through the heavy current conduction tube of stage 228, so that the relatively high voltage drop across resistance 230 results in a substantial reduction in the potential of lead 226. On the other hand, space current flows from the positive ungrounded terminal of source 301, through resistance 305, through resistance 306, through a portion of the "Time base length control" resistance 231A, through lead 307, through resistance 231, and then to ground through the heavy current conducting tube of stage 229.

The potential of these leads 226 and 227, normally maintained at a relatively low potential due to the aforesaid heavy current flow through resistances 230, 231, respectively, may thus vary significantly only during the time of application of the negative gating voltage 235 which causes the current flowing through resistances 230, 231 to decrease appreciably in timed relationship with the transmitted pulse and with the same repetition rate, of, for example, 1833 pulses per second. The duration of such gating voltage 235 corresponds to the time required for a radar pulse to travel to a target and return as an echo from the maximum effective distance, which, for example, may be six miles. While the leads 226, 227 are thus unclamped at the rate of, for example, 1833 times per second, the voltage developed by the angle voltage generator 205A varies from its minimum value to a maximum value at a much lesser rate of, for example, one cycle per second. Thus, the amplified inverted gating voltage waves 235, recurrently applied to the leads 226, 227 may be said to be modulated in accordance with "angle volts" derived from generator 205A. This modulated wave resulting from combining "angle volts" with the inverted "gating voltage" 235 is modified, on the one hand, by condenser C1112 and resistance R1148, and on the other hand, by condenser C1119 and resistance R1203, so that the voltage waves actually applied to such leads follow an exponential variation and appear as the waves 240, 241. This exponential variation results from the fact that the time constant of the circuit connected with these resistances and condensers is comparable to the duration of the gating pulse 235. This being so, the condensers C1112 and C1119 never reach a fully charged condition but their charging is interrupted when, for example, such condensers are approximately two thirds charged. Thus, the curved portion of waves 240, 241 follow substantially along the well known exponential charging current curves for circuits having a condenser serially connected with a resistance. In other words, instead of such waves 240, 241 being of the conventional sawtooth type characterized by substantially straight lines, in this instance the waves are characterized by curved lines. While the general shape of curves 240, 241 depend upon the product of resistance and capacity in such serial circuit, the "pedestal" or "step" of such waves represented by the vertical lines OK, OL, respectively, in Figure 1 is determined respectively by the magnitude of resistance R1148 and R1203 which determine the initial potential distribution at the instant the associated condensers begin to charge.

The desirability and necessity for providing the waves 240, 241 with a relatively large step or pedestal is made manifest from a study of Figure 6, which indicates that the initial potential applied to the deflecting coils, as represented by the line 201, must be larger than would otherwise be the case if distances measured along the sweeps were on a linear scale, as represented by line 200.

The resulting voltage waves 240, 241 are amplified respectively in amplifiers 250, 251 so as to produce a resulting current flow indicated by the current waves 240A, 241A in corresponding deflection coils 226, 225. The rate of change of current through the coils is exponential in character, thus distances measured along the resulting sweeps are on a substantially logarithmic scale.

The voltage wave 240, as indicated above, is a wave modulated in accordance with "angle volts," the modulation being such that the intensity of succeeding waves 240 increases in amplitude with increased outward swing of the radar antenna 204, as indicated by the series of curves 253 in Figure 1 to produce "unidirectional magnification" or "unidirectional expansion" in the cathode ray presentation, wherein the angular excursion of the radar antenna is shown in expanded form on the cathode ray tube.

On the other hand, the voltage wave 241, as indicated above, is also modulated in accordance with "angle volts" but, as explained hereinafter, is modulated in a manner different than wave 240, to a lesser degree and for a different purpose, namely, to pivot the "center of magnification" of the cathode ray presentation about a point adjacent the aircraft landing strip where the radar apparatus is located to an axis extending generally parallel to the central longitudinal axis of the aircraft landing strip, and such that the range marks extend vertically.

Briefly, when and as the antenna swings outwardly, the voltage generated in the angle volt generator 205A increases, but a portion of this voltage is inverted in inverter stage 231A and used to cause the intensity of successive voltage waves 241 to decrease. However, the voltage from generator 205A produces appreciably less percentage variation in the intensity of the wave 241 than such voltage produces in wave 240; in the first instance, the introduction of "angle volts" produces a compensatory effect to allow more convenient tracking of aircraft by causing range marks to be perpendicular to the aircraft runway center line, while in the latter instance, the introduction of angle bolts is largely instrumental in producing the aforementioned "unidirectional expansion," or "unidirectional magnification." For these reasons, the amplifier 250 is commonly referred to as the "expansion" amplifier, and the amplifier 251 is commonly referred to as the "time base" amplifier. The output of the time base amplifier 251 delivered to the fixed coil 225 thus corresponds to the vector OM' (Figure 5) of fixed position, and the output of the "expansion" amplifier 250 delivered to the fixed coil 226 corresponds to the vector OL' (Figure 5), also of fixed position, but variable in magnitude over a considerable range in accordance with excursions in the value of "angle volts" supplied from generator 205A.

By employing the techniques described in the above mentioned patent application, Serial No. 776,702, both azimuth versus range as well as elevation versus range information may be portrayed on the face of a single cathode ray tube, as shown in Figure 8. A characteristic feature of the display shown in Figure 8 is that the range lines are coextensive through the two displays whereby an observer may quickly locate an aircraft in three dimensional space with reference to two predetermined glide paths.

The display shown in Figure 8 shows two types of data, one the so-called azimuth or Az display 310 and the elevation or El display 311. The azimuth display 310 shows a representation of angular sweep of the azimuth antenna which is essentially the same as in Figure 4 but with the distance or range plotted on a logarithmic scale. A diagram of the aircraft landing strip 312 with respect to the position or point 313 in space at which the radar scanning apparatus is located is indicated by the rectangle with a series of sloping lines therethrough. Further, the display 310 indicates the predetermined or desired glide path of the aircraft by the line 314 which is marked "center of course," it being noted that the series of generally horizontally extending lines indicating the deviation of the aircraft from the predetermined glide path are substantially equally spaced as measured along any one particular vertically extending range mark; however, it being noted that the intervals between these deviation lines are greater along range marks close to the origin. In other words, while the deviation lines 400, 401, 402, 403, 404, 406 and 408 are equally spaced as for example along the two mile range mark or line 320, their relative spacing while still uniform along the one mile range mark is greater along such one mile range mark than along the two mile range mark. Further, the radial or polar distance from the point 313 to a point on the display, corresponding to the range of the aircraft, is represented on a logarithmic scale. Another important feature of the display 310 is that while the azimuth antenna scans, in fact, through an angle of approximately only 20°, this angle corresponds to approximately 60° in the display. In other words, the display is unidirectionally magnified in one dimension for purposes of accurately determining the position of the aircraft in space. This unidirectional magnification of the display is characterized by the fact that distances measured vertically thereon, as deviations from the line 314, are magnified with respect to distances measured along the line 314. The other display, the elevation display 311, has the same characteristics, namely, the representation is unidirectionally magnified with respect to the predetermined or desired glide path, which is represented by the line 316, and further, distances measured parallel to such line 316 are on a logarithmic scale, and the deviation lines have the same interrelationship with the range marks as described above in connection with the azimuth display.

It is noted further that each of the displays 310, 311 have common vertical lines 317, 318, 319, 320, 322, 323, 324, 325, which correspond respectively to ranges of one quarter, one half mile, one, two, three, four, five and six miles from the point or position 313, of the radar apparatus in space. Thus, this display 310, 311 quickly allows an observer to ascertain the position of an aircraft in three dimensions.

While the system is described above adjusted for producing logarithmic sweeps, the system may be converted to produce linear sweeps of the character described in the above mentioned Tasker patent application, Serial No. 680,604, by making primarily two adjustments, namely: (1) by adjusting the magnitude of the step voltages OK and OL (Figure 1) and (2) by making the curved portion of the voltage waves 240, 241 linear so that these voltage waves are trapezoidal. Specifically, these two adjustments may be made respectively, (1) by decreasing the magnitudes of corresponding resistances R1148 and R1203, and (2) by increasing the magnitudes of corresponding condensers C1112 and C1119.

It is thus apparent that one of the important features of the present invention is the provision of means whereby a cathode ray beam is moved at a non-uniform rate in developing a sweep. While it is understood that it is within the province of the present invention to impart generally a non-uniform speed to the cathode ray beam, it is preferred that such non-uniform speed be logarithmic in nature. Further, while the invention finds great utility in a so-called expanded position indicating system of the type described in the aforementioned Tasker patent application, certain phases of the invention may find utility in other systems such as plan position indicators (PPI) wherein the cathode ray tube representation does not include the so-called unidirectional expansion.

In order to avoid any possible confusion which might result from the fact that the sweeps preferably used herein are logarithmic, and that the point of origin of the radial sweeps may be considered to be a zero reference point so far as measured distances on the representation are concerned, and the fact that the logarithm of zero is equal to minus infinity, it is observed that the production of a logarithmic sweep, as defined herein, does not depend for its operation on the starting of the sweep at any one particular time, for example, zero time, in view of the fact that any fractional portion of a curve representing a logarithmic variation is logarithmic in character so far as that particular portion of the curve is concerned. For that reason, for example, the origin of the representation need not correspond to the point A on the curve 201 in Figure 6, but may correspond to, for example, the points B or C.

While it is preferred to make the sweeps with a logarithmic characteristic, it is desirable under some conditions to deviate from a true logarithmic characteristic; as for example, when it is desired to improve the linearity of a center of course line, as for example, the center of course line 314 shown in Figure 8. In such instance, the control of linearity of this particular line 314 may be controlled, for example, by adjustment of the step-control resistances R1148 and R1203 (Figure 1), and adjustment of the linearity controls 401 and 402 associated with the expansion amplifiers 250 and 251. Linearity controls of the type shown as 401 in Figure 1 may be of different types, as is well known in the art, to change the amplitude response of the associated amplifier. For example, this linearity control may be of the type effective to change the range or median point of operation along the mutual conductance versus control voltage curve of an electron discharge device in such amplifier 250, or other means may be used for that purpose.

While the present invention has been described in relationship to the so-called precision indicator section of G. C. A. equipment, it is clear that the invention likewise has utility in the search or PPI section of such G. C. A. equipment.

While the desired expansion produced herein is logarithmic in character, i. e., dependent upon the rate of variation of voltage across a condenser, when and as such condenser is charged through a resistance, it is within the province of the present invention to use other means for obtaining substantially the same results flowing from such logarithmic expansion. For example, instead of the expansion being logarithmic, it may be exponential in nature. It is noted that within the limited range along a logarithmic and comparable exponential curve, the variations are substantially the same, although an exponential curve has a finite asymptote, whereas a logarithmic curve is asymptotic at infinity. In order to produce substantially a logarithmic variation of voltage similar to the exponential variation of voltage accomplished by the use of the resistance R1148 and condenser C1112, Thyrite may be employed. As is well known, the current flow through Thyrite increases more than linearly with respect to the voltage applied thereto. The relationship between current and voltage in such case is logarithmic in character and may be used to change the potential of the leads 226, 227 accordingly.

It is noted further that while it is preferred to use the logarithmic type of expansion described above, the system may easily be converted to produce the conventional linear expansion of the type described in the above mentioned copending patent applications, Serial Nos. 680,604 and 776,702, by decreasing the magnitude of resistances R1148 and R1203. By providing such adjustment R1148 and R1203, the operator has a choice of either logarithmic expansion as defined herein or linear expansion as described in the above mentioned copending patent applications 680,604 and 776,702.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. In combination, means for producing and scanning a beam of electromagnetic wave energy pulses through space, means for producing a cathode ray beam, first means for moving said cathode ray beam with a nonuniform decreasing rate in timed sequence with said energy pulses to form a cathode ray sweep such that distances measured along said sweep are on substantially a logarithmic scale, said first means including a pair of quadraturely acting cathode beam deflecting means to each of which is applied a nonuniform voltage variation, means for moving said cathode ray sweep angularly to different angular positions, and means including the last mentioned means arranged to vary the length of said sweep in accordance with the particular corresponding angular position of said sweep and in timed sequence with scanning of said beam to produce a unidirectionally expanded representation in azimuth wherein distances corresponding to azimuthal variations are magnified with respect to distances in quadrature thereto corresponding to range variations.

2. In a system of the character described, first means emitting a series of pulses at a relatively large rate which form a sharply directed beam in space, second means moving said beam in space at a relatively small rate, a pair of control means, third means energizing said pair of control means recurrently with "sawtooth" waves in timed relationship with said series of pulses, means providing a source of energy varying in magnitude with the particular angular position of said beam, said source of energy being connected to produce substantially larger control forces varying at said small rate in one of said pair of controls than in the other one of said pair of controls, and wave shaping means imparting an exponential variation to said waves individually.

3. In a system of the character described, wherein at least a pair of cathode ray beam deflecting means are each energized recurrently with waves in timed relationship with a series of energy pulses which form a sharply directed beam arranged to move to scan a space, and wherein the cathode ray deflecting means is energized with energy varying in magnitude with the particular angular position of the beam, the step comprising producing substantially greater beam deflections with said energy by one of said deflecting means than by the other, and simultaneously shaping each of said waves to impart an exponential variation to the same individually.

4. In an object locating system of the type in which an exploratory sharply directed pulsed energy beam is turned to scan an area, reflections of said beam from objects within said area are received, and a representation is obtained, first means producing an electromagnetic beam of energy pulses recurring at a relatively large rate, means effective to move said beam to different oriented positions, a pair of controls each effective to produce an electrical effect in different directions, means recurrently energizing each of said pair of controls with waves in timed relationship with operation of said first means, and one of said controls being energized in an amount varying continuously with the particular angular position of said beam to produce substantially larger control effects on one of said controls than on the other, and wave shaping means imparting an exponential variation to each of said waves individually.

5. In an object locating system of the type in which an exploratory sharply directed pulsed energy beam is turned to scan an area, reflections of said beam from objects within said area are received, and a representation of such area is obtained, first means producing an electromagnetic beam of energy pulses recurring at a relatively large rate, means effective to move said beam to different oriented positions, a pair of quadraturely acting cathode ray beam deflecting means each arranged to deflect a cathode ray beam in different directions, means recurrently energizing with a sawtooth type of wave each of said pair of beam deflecting means in timed relationship with said energy pulses, and means energizing one of said pair of beam deflecting means in an amount varying with the particular oriented position of said beam to produce larger deflections with one of said beam deflecting means than with the other one of said beam deflecting means, and wave shaping means imparting an exponential variation to each of said sawtooth waves.

6. In an object locating system of the type in which an exploratory sharply directed pulsed energy beam is turned to scan an area, reflections of said beam from objects within said area are received, and a representation is obtained, means producing a plurality of trains of "sawtooth" waves recurring at a relatively high frequency in timed relationship with the transmission of pulsed energy, means producing a third wave source the intensity of which varies with the angular position of the beam, means modulating one of said trains of waves with energy from said third wave source in a degree greater than the other is modulated to produce unidirectional magnification in the representation, and wave shaping means imparting an exponential characteristic to said waves individually.

7. In an object locating system of the type in which an exploratory sharply directed pulsed energy beam is turned to scan an area, reflections of said beam from objects within said area are received, and a representation is obtained, means producing a plurality of trains of sawtooth waves recurring at a relatively high frequency in timed relationship with the transmission of pulsed energy, wave shaping means imparting an exponential characteristic to each of said waves individually, a cathode ray tube having associated beam deflecting means, means applying said waves having an exponential characteristic to said deflecting means to thereby produce excursions of the beam over said cathode ray tube of varying speed to portray distances on said cathode ray tube on a substantially logarithmic scale.

8. In an object locating system of the type in which an exploratory sharply directed pulsed energy beam is turned to scan an area, reflections of said beam from objects within said area are received, and a representation is obtained, means producing a plurality of trains of sawtooth waves recurring at a relatively high frequency in timed relationship with transmission of pulsed energy, and wave shaping means imparting an exponential characteristic to each of said waves individually, quadraturely acting cathode beam deflecting means, and means applying said waves to corresponding ones of said beam deflecting means.

9. In combination, means arranged to produce a cathode ray beam, first means for scanning a predetermined area in space through an angle $\theta$, second means including quadraturely acting cathode beam deflecting means acting upon said beam in synchronism with said scanning means to move said beam to provide a sweep and to rotate said sweep about a central original position through an angle $\phi$ to form a two-dimensional azimuthal range representation of said area, said second means including means for varying the length and angular position of the sweep in accordance with the relationship of $\tan \phi = n \tan \theta$, where $n$ stands for a number greater than one, and said second means including means for applying nonuniform varying voltages to each of said cathode beam deflecting means to move said beam at a nonuniform decreasing rate, such that distances measured along said sweep are on a substantially logarithmic scale.

10. In a system of the character described, means producing an antenna beam which is produced by a pulse of electromagnetic energy occurring at a predetermined rate and for scanning said antenna beam periodically through space to develop echo video signals from objects within a predetermined maximum range, indicating means including a cathode ray beam with quadraturely acting cathode beam deflecting means, sawtooth wave generating means operated at said rate for developing sawtooth waves, means imparting an exponential variation to said sawtooth waves, and means applying said sawtooth waves, as modified by said last mentioned means, to each of said quadraturely acting cathode beam deflecting means.

11. In an arrangement of the character described, antenna means for producing an energy beam and for oscillating the same in space, cathode beam deflecting means, means for deriving a source of voltage, the instantaneous magnitude of which represents the position of said beam which is radiated from said antenna means in space, a resistance and condenser serially connected with said source, gate generating means for generating a gate having a duration commensurate with the expectant period of radar echos, clamping means coupled to said gate generating means and effective to substantially discharge said condenser during the time that radar echos are not being expected, said condenser and resistance combination having a time constant commensurate with such expectant period of radar echos such that said condenser is never completely charged to said instantaneous magnitude of voltage and means coupling the voltage developed across said resistance condenser combination to said beam deflecting means to produce substantial logarithmic cathode beam sweeps.

12. In an arrangement of the character described, antenna means for producing an energy beam and for oscillating the same in space, cathode beam deflecting means, means for deriving a source of voltage, the instantaneous magnitude of which is representative of the position of said beam which is radiated from said antenna means in space, a condenser, a resistance serially connected with said condenser and said source, means periodically discharging said condenser in timed relationship with energy pulses forming said antenna beam, said resistance and condenser combination having a time constant commensurate with the expectant period of radar echos developed from reflection of the antenna beam, from objects within a predetermined maximum range, and means coupling the voltage developed across said condenser to said cathode beam deflecting means.

13. In a system of the character described, means for producing an antenna beam, pulsed at a relatively high rate, and for scanning said antenna beam which is radiated from an antenna through space at a relatively low rate, to develop echo video signals from objects within a predetermined maximum range, means deriving an antenna beam angle voltage representative of the instantaneous angular position of said antenna beam in space, indicating means including a cathode ray tube with quadraturely acting cathode beam deflecting means, means inverting said voltage to produce an inverted antenna beam angle voltage, a first condenser charging circuit comprising a first condenser and a first resistance, a second charging circuit comprising a second condenser and a second resistance, said first condenser and said second condenser charging circuits each having a time constant commensurate with the expectant period of radar echos, means coupling said antenna beam angle voltage to said first condenser charging circuit, means coupling said inverted antenna beam angle voltage to said second condenser charging circuit, means for discharging said first and said second condensers at said relatively high rate, means coupling the voltage developed across said first condenser to one of said beam deflecting means, and means coupling the voltage developed on said second condenser to a second one of said cathode beam deflecting means.

14. A plan position indicating radar system including a receiver, a cathode ray tube connected to said receiver and having beam-deflecting means for producing cathode beam sweeps and a fluorescent screen, means for the presentation of signals impressed on said tube by said receiver along polar coordinates on said screen, means coupled to said deflecting means for locating the polar origin of said presentation substantially at the periphery of said screen, and further means coupled to said deflecting means for expanding said polar coordinate presentation in the angular direction, said further means incorporating means for modifying said sweeps such that polar distances in said presentation are measured on a substantially logarithmic scale.

15. A plan position indicating radar system including a receiver, a cathode ray tube connected to said receiver and having beam-deflecting means for producing cathode beam sweeps and a fluorescent screen, means for the presentation of signals impressed on said tube by said receiver along polar coordinates on said screen, means coupled to said deflecting means for locating the polar origin of said presentation substantially at the periphery of said screen, means for sweeping the electron beam radially from said origin substantially entirely across said screen at a nonuniform rate, and further means coupled to said deflecting means for angularly expanding said polar coordinate presentation whereby a given angle is represented by a larger angle on said screen, and means for modifying said sweeps such that polar distances measured on said presentation are on a substantially logarithmic scale.

References Cited in the file of this patent

UNITED STATES PATENTS

| | | |
|---|---|---|
| 2,300,189 | Wolff | Oct. 27, 1942 |
| 2,405,231 | Newhouse | Aug. 6, 1946 |
| 2,455,283 | Valley, Jr. | Nov. 30, 1948 |
| 2,459,481 | Wolff et al. | Jan. 18, 1949 |
| 2,480,208 | Alvarez | Aug. 30, 1949 |
| 2,554,515 | Young | May 29, 1951 |
| 2,585,855 | Sherwin et al. | Feb. 12, 1952 |
| 2,611,126 | Irving | Sept. 16, 1952 |

FOREIGN PATENTS

| | | |
|---|---|---|
| 520,778 | Great Britain | May 3, 1940 |